United States Patent Office 2,773,857
Patented Dec. 11, 1956

2,773,857

1,4-DISUBSTITUTED-2-CYANO-1,3-BUTADIENES

Burt Carlton Pratt, Wilmington, Del., assignor to E. I. du Pont de Nemours and Company, Wilmington, Del., a corporation of Delaware No Drawing. Application July 23, 1953,
Serial No. 369,971

13 Claims. (Cl. 260—88.5)

This invention relates to new chemical compounds and polymers therefrom and, more particularly, to a new class of dienes and their polymers.

Conjugated dienes by reason of the activity of their double bonds constitute a valuable class of chemical intermediates and form the chief basis of the synthetic rubber industry. For the most part, however, attention has heretofore been centered on a relatively small number of conjugated dienes, principally butadiene and chloroprene, which contain terminal methylene ($=CH_2$) groups. Fundamental work in this field (see the collected papers of Dr. W. H. Carothers, "High Polymers," vol. I, Interscience 1940, pages 273–277) has established rather thoroughly the concept that substitution on more than one terminal carbon of a 1,3-diene structure, that is, substitution on both the 1- and 4-carbons, results in products of extremely low polymerization tendency.

An object of the present invention is to provide a new class of conjugated dienes. A further object is to provide new and valuable compositions of matter comprising polymers of these dienes. Other objects will be apparent from the description of the invention given hereinafter.

The above objects are accomplished according to the present invention by providing, as new compounds, 2-cyano-1,3-butadienes carrying a single monovalent organic substituent, alike or different, on each of the 1- and 4-carbons, i. e., these compounds are 1,4-disubstituted-2-cyano-1,3-butadienes, and polymers thereof.

Because of the readier availability of the necessary intermediates, the preferred new compounds of this invention are the 2-cyano-1,3-butadienes carrying on the 4-carbon a single monovalent, aliphatic hydrocarbon radical and on the 1-carbon a single monovalent organic radical of no more than 7 carbons. Because of the more desirable properties inherent therein, especially the capability of polymerizing alone or with other polymerizable ethylenically unsaturated compounds, the more preferred compounds of this invention are the 2-cyano-1,3-butadienes carrying on the 4-carbon a single alkyl radical of no more than 4 carbons and on the 1-carbon a single monovalent hydrocarbon radical of no more than 7 carbons and free of aliphatic unsaturation.

The new compounds of this invention can be represented by the following structural formula:

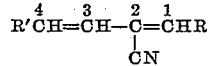

wherein R and R', which may be alike or different, are monovalent organic radicals, and, preferably, where R' is a monovalent lower aliphatic hydrocarbon radical and R is a monovalent organic radical of no more than 7 carbons. The more preferred compounds of the present invention are those wherein R' is an alkyl radical of no more than 4 carbons and R is a monovalent hydrocarbon radical of no more than 7 carbons and free of aliphatic unsaturation.

The new class of monomeric 1,4-disubstituted-2-cyano-1,3-butadienes of this invention can be readily prepared from 3-alkenenitriles containing at least 5 carbon atoms, by condensation with an aldehyde of at least 2 carbon atoms in the presence of a basic condensing agent. This preparation may be illustrated by the following equation:

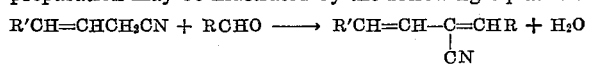

wherein R and R' have their above-mentioned meanings. The substituent on the 4-carbon of the 3-alkenenitrile intermediate becomes the substituent on the 4-carbon of the 1,4-disubstituted-2-cyano-1,3-butadienes of this invention. Similarly, the basic moiety of the carboxaldehyde intermediate, i. e., R in the structure RCHO, becomes the single substituent on the 1-carbon of the 1,4-disubstituted-2-cyano-1,3-butadienes of this invention.

The preparation of these compounds can be accomplished simply by bringing the carboxaldehyde in contact with the requisite 3-alkenenitrile in the presence of a basic material and, if necessary, heating the mixture to reaction temperature. A convenient procedure consists in dissolving chemically equivalent quantities of the carboxaldehyde and the 3-alkenenitrile in a mutual solvent, e. g., an alcohol, and introducing the basic catalyst portionwise in order to minimize self-condensation and also because the reaction is usually exothermic. When a strong base, such as an alkali alkoxide, is used, reaction occurs at ordinary temperatures or even below, e. g., 0° C. It is generally desirable, however, to heat the mixture to 50° C. to 100° C. or higher during the latter part of the reaction. The nitrile-containing diene obtained can be separated from the reaction mixture by distillation, extraction, or other suitable means. The most suitable method of isolation in a given case will depend upon the boiling point of the compound and the nature of the solvent used in its preparation.

The 3-alkenenitriles used as one of the intermediates in preparing these new cyanobutadienes, as indicated above, have the formula $R'CH=CHCH_2CN$, wherein R' has the same significance as given heretofore. These 3-alkenenitriles can be readily prepared by reacting hydrogen cyanide with a conjugated hydrocarbon diene, having a terminal methylene group, as described in detail in U. S. Patents 2,422,859 and 2,447,600. Thus, 3-pentenenitrile can be conveniently prepared by reaction of hydrogen cyanide with butadiene in the presence of cuprous chloride, as described in detail in U. S. Patent 2,509,859 or in the presence of cobalt carbonyl as given in detail in U. S. Patent 2,666,780.

Both homopolymers and copolymers of these compounds can be obtained by protracted heating of the monomeric diene at elevated temperatures, e. g., 100° C.– 300° C. A polymerization catalyst is not essential and, in fact, the polymerization occurs in the presence of the conventional polymerization inhibitors. The polymerization can be carried out under atmospheric or superatmospheric pressure. If desired, solvents such as chlorobenzene, alcohols, and the like, may be added. Use of a mixture of monomeric dienes or such dienes with other polymerizable compounds leads to copolymers.

In the thermal and apparently uncatalyzed polymerization of the dienes of this invention autogenous pressure and temperatures within the range of from 140° C.–250° C. usually give the most satisfactory results and are preferred. It is also desirable, though not essential, to conduct such polymerizations in an inert atmosphere. In the preparation of this type of polymer, it is also preferable, when operating at the higher temperatures to employ polymerization inhibitors in order to prevent unwanted side reactions. Especially suitable for this purpose are the polyhydroxyphenolic compounds such as hydroquinone and catechol which are satisfactorily employed in amounts of from 0.5% to 5% of the weight of the monomers.

The invention is illustrated in greater detail in the following examples in which parts, unless otherwise specified, are by weight. Examples I to VI illustrate the preparation of the new monomeric compounds of this invention and Examples VII to XII the polymers thereof.

*Example I*

A solution of 3 parts of sodium dissolved in 47 parts of absolute ethyl alcohol was added dropwise to a solution of 53 parts of freshly distilled benzaldehyde and 32.4 parts of 3-pentenenitrile in 316 parts of absolute ethyl alcohol. During the addition of the sodium ethylate solution over a period of about 45 minutes, the reaction mixture was stirred and blanketed with nitrogen and the temperature rose from 21° C. to 36° C. The reaction mixture was next heated on the steam bath under a reflux condenser for three hours. The crude reaction product was then poured into ice water and extracted with ethyl ether. This ether solution was dried over anhydrous sodium sulfate, filtered and evaporated on the steam bath. Distillation of the resulting residual oil under reduced pressure yielded 47 parts of 1-phenyl-4-methyl-2-cyano-1,3-butadiene (2-benzylidene-3-pentenenitrile) in the form of a light yellow oil, B. P. 160° C./16 mm.; $n_D^{25}$ 1.6112. On redistillation, through a 30 cm. Fenske-ring packed column at a reflux ratio of 1:10, the product obtained possessed the following constants: B. P. 135–7° C./4 mm.; $n_D^{25}$ 1.6110; $d_{25}^{25}$ 1.1040.

*Analysis.*—Calc'd. for $C_{12}H_{11}N$: N, 8.28; $M_D$ 52.83. Found: N, 8.30; $M_D$ 53.50.

1 - phenyl - 4 - n - butyl - 2 - cyano - 1, 3 - butadiene (2 - benzylidene - 3 - octenenitrile) can be prepared by substituting 3-octenenitrile in chemically equivalent amount for the 3-pentenenitrile in the above procedure.

*Example II*

Under anhydrous conditions and in a reaction system equipped for refluxing, a stirred solution of 24 parts of furfuraldehyde, 16.2 parts of 3-pentenenitrile and 158 parts of absolute ethyl alcohol was treated dropwise over a period of about 2 hours with a solution of 1.5 parts of sodium in 24 parts of absolute ethyl alcohol. The temperature of the reaction mixture during this addition rose from 27° C. to 50° C. The reaction mixture was next heated on the steam bath under a reflux condenser for 2 hours after which it was cooled, neutralized with acetic acid, and then poured into ice water. The product was extracted with ethyl ether and after drying the ether solution over anhydrous sodium sulfate, it was distilled. There was thus obtained 22 parts of light yellow oily 1-(2-furyl)-4-methyl-2-cyano-1,3-butadiene (2-furfurylidene-3-pentenenitrile), B. P. 117–118° C./6 mm.; $n_D^{25}$ 1.627.

*Analysis.*—Calc'd. for $C_{10}H_9NO$: N, 8.81. Found, N, 8.87.

*Example III*

Forty-three and two-tenths (43.2) parts of isobutyraldehyde and 32.4 parts of 3-pentenenitrile were charged into a reaction vessel equipped with an agitator, reflux condenser, thermometer and dropping funnel. To this solution maintained at 5° C.–25° C. was added dropwise over a period of about one hour a solution of 3 parts of sodium in 47 parts of absolute ethyl alcohol. During addition of the sodium ethylate catalyst solution, it was necessary to externally cool the reaction mixture in order to maintain the reaction temperaure at 5° C.–25° C.

After standing three days at room temperature, the reaction mixture was neutralized with acetic acid, washed with water, the water extracted with ethyl ether, and the ether solution dried over anhydrous sodium sulfate. The residual oil after evaporation of the ether was distilled from a modified Claisen flask to give 34 parts of colorless oily 1-isopropyl-4-methyl-2-cyano-1,3-butadiene (2-iso- butylidene-3-pentenenitrile), B. P. 97–102° C./32 mm.; $n_D^{25}$ 1.4647; $d_{25}^{25}$ 0.8490.

*Analysis.*—Calc'd. for $C_9H_{13}N$: C, 80.00; H, 9.64; N, 10.36; $M_D$ 40.16. Found: C, 78.26; H, 10.07; N, 10.44; $M_D$ 43.8.

*Example IV*

A solution of 3 parts of sodium dissolved in 47 parts of absolute ethyl alcohol was added to a mixture of 32.4 parts of 3-pentenenitrile and 26.4 parts of acetaldehyde while maintaining the temperature at 15° C.–20° C. by means of an ice bath. The reaction mixture was then stored for 15 hours at 15° C. after which it was neutralized with acetic acid and washed with water. The oil layer was dried with sodium sulfate, and then filtered. A small amount of hydroquinone was added and the liquid was distilled from a modified Claisen flask, a fraction amounting to 4 parts of boiling at 68–72° C./37 mm. being collected as 1,4-dimethyl-2-cyano-1,3-butadiene (2-ethylidene-3-pentenenitrile). The refractive index ($n_D^{25}$) of this product was 1.4360.

*Example V*

A mixture of 42 parts of crotonaldehyde and 32.4 parts of 3-pentenenitrile cooled in an ice bath was treated dropwise over a period of three hours with a solution of three parts of sodium and 47 parts of absolute ethanol and then allowed to stand at room temperature for six days. The resultant oil was neutralized with acetic acid, washed with water, dried over anhydrous sodium sulfate and distilled. A fraction of colorless oily 1-(1-propenyl)-4-methyl-2-cyano-1,3-butadiene (2,4,6-octatriene-4-carbonitrile), B. P. 96–98° C./29 mm.; $n_D^{25}$ 1.4309, amounting to 5.3 parts was obtained.

*Analysis.*—Calc'd. for $C_9H_7N$: N, 10.52. Found: N, 10.77.

*Example VI*

By the procedure of Example III, a 51% conversion to 1-(p-methoxyphenyl)-4-methyl-2-cyano-1,3-butadiene (2-p-methoxybenzylidene-3-pentenenitrile), B. P. 153° C.–155° C./2 mm. was obtained by condensing p-methoxy-benzaldehyde with 3-pentenenitrile in the presence of 32 mole percent of sodium ethoxide based on the alkenenitrile.

*Analysis.*—Calc'd. for $C_{13}H_{13}ON$: N, 7.04. Found: N, 7.11.

*Example VII*

At 105 C. in a sealed tube and in the presence of 0.1% of its weight of hydroquinone, monomeric 1-phenyl-4-methyl-2-cyano-1,3-butadiene (2-benzylidene-3-pentenenitrile), polymerized to form a very viscous oil after two weeks, and at the end of four weeks at this temperature a soft, brown solid was obtained.

*Example VIII*

A shock-brittle, brownish-colored polymer was obtained by heating monomeric 1-phenyl-4-methyl-2-cyano-1,3-butadiene (2-benzylidene-3-pentenenitrile) with 0.1% of its weight of hydroquinone under nitrogen in a sealed glass vessel for 48 hours at 170° C. The resulting benzene-soluble polymer possessed an iodine number of 9.5.

*Example IX*

Monomeric 1-phenyl-4-methyl-2-cyano-1,3-butadiene (2-benzylidene-3-pentenenitrile), blanketed with nitrogen and heated in an open vessel at 200° C. for five hours, gave a brown rosin-like polymer which was soluble in benzene. X-ray diffraction measurements indicated it to be non-crystalline.

*Example X*

Treatment of 1-phenyl-4-methyl-2-cyano-1,3-butadiene (2-benzylidene-3-pentenenitrile), under 7500 atmospheres pressure and at 200° C. for five hours produced a shock-brittle polymer which was harder and less tacky than a similar polymer prepared by heating for 48 hours at 175° C. under atmospheric pressure. It was soluble in benzene and chloroform, but insoluble in ethanol and acetic acid. The iodine number value was 6.4.

*Example XI*

A soft, tough, brown polymer, soluble in benzene, was formed by heating 1,(2-furyl)-4-methyl-2-cyano-1,3-butadiene (2-furfurylidene-3-pentenenitrile) monomer at atmospheric pressure in the presence of a trace of hydroquinone for five hours at 180° C.

*Example XII*

A viscous, oily polymer was formed by heating the 1,4 - dimethyl - 2 - cyano - 1,3 - butadiene (2 - ethylidene-3-pentenenitrile) of Example IV above in a sealed tube in the presence of 0.1% of hydroquinone for 48 hours at 200° C.

A similar viscous, oily polymer was obtained under the same conditions using the 1-isopropyl-4-methyl-2-cyano-1,3-butadiene (2-isobutylidene-3-pentenenitrile of Example III above.

In contrast to this surprising polymerization tendency of these 1,4-disubstituted-2-cyano-1,3-butadienes which polymerize even in the presence of an inhibitor, the homologous 1,1,4-trisubstituted and 1,1,4,4-tetrasubstituted 2-cyano-1,3-butadienes show no polymerization tendency whatever, even in the presence of known polymerization initiators, to say nothing of no evidence of polymerization being exhibited under the above conditions, i. e., in the presence of a polymerization inhibitor. More specifically, 1,1,4-trimethyl-2-cyano-1,3-butadiene, (2-isopropylidene-3-pentenenitrile) prepared in the manner of the foregoing examples by the condensation between 3-pentenenitrile and acetone in the presence of an alkaline catalyst, gave not evidence of polymerization when heated for 48 hours at 200° C. in a sealed tube in the presence of hydroquinone inhibitor, nor when heated for 52 hours at 100° C. in a sealed tube in the presence of benzoyl peroxide polymerization initiator. Similarly, 1,1,4,4-tetramethyl-2-cyano-1,3-butadiene (2-isopropylidene-4-methyl-3-pentenenitrile) exhibited no tendency for polymerization under exactly the same conditions. This tetramethyl-substituted-2-cyano-1,3-butadiene was obtained in the manner illustrated in the examples by the alkaline catalyzed condensation of acetone and 4-methyl-3-pentenenitrile. The 4-methyl-3-pentenenitrile was obtained in good yield by the cobalt carbonyl catalyzed addition of hydrogen cyanide to isoprene as given in detail in Example XXI of the aforementioned U. S. Patent 2,666,780.

It will be understood that the above examples are merely illustrative and that the present invention broadly comprises, as a new class of compounds, those 2-cyano-1,3-butadienes carrying a single monovalent organic substituent on each of the 1- and 4-carbons, and polymers thereof.

In addition to certain compounds of the examples, the preferred compounds wherein the substituent on the 4-carbon is a monovalent alkyl radical or no more than 4 carbons and the substituent on the 1-carbon is a monovalent aliphatic, aromatic, alkaromatic, araliphatic, cycloaliphatic, or heterocyclic radical of no more than 7 carbons and free of aliphatic unsaturation, including the following: 1-benzyl-4-ethyl-2-cyano-1,3-butadiene which can be prepared from 3-hexenenitrile and phenylacetaldehyde; 1-phenyl-4-propyl-2-cyano-1,3-butadiene which can be prepared from 3-heptenenitrile and benzaldehyde; and 1,4-dibutyl-2-cyano-1,3-butadiene which can be prepared from 3-octenenitrile and valeraldehyde, the preparation following the procedures described in the examples.

Copolymers, i. e., polymers of mixtures of more than one of the monomeric 1,4-disubstituted-2-cyano-1,3-butadienes of this invention, can be prepared by the processes described herein. Copolymers can similarly be prepared from one or more of these new 1,4-disubstituted-2-cyano-1,3-butadienes and other polymerizable ethylenically unsaturated compounds. Specific copolymers include 1-phenyl - 4 - methyl - 2 - cyano - 1,3 - butadiene/1 (2 - furyl)-4-methyl-2-cyano-1,3-butadiene copolymer and 1 - phenyl - 4 - methyl - 2 - cyano - 1,3 - butadiene/1,4 - dimethyl-2-cyano-1,3-butadiene copolymer.

The new monomeric 1,4-disubstituted-2-cyano-1,3-butadienes of this invention are conveniently prepared by the reaction of a carboxaldehyde as previously defined, with a 3-alkenenitrile containing 5 or more carbon atoms, under alkaline conditions. Because of availability and ease of reaction, it is preferred to use 3-alkenenitriles of 5 to 8 carbon atoms. Suitable 3-alkenenitriles which can be used in place of 3-pentenenitrile are 3-hexenenitrile, 3-heptenenitrile, and 3-octenenitrile.

Examples of additional carboxaldehydes which can be used for the preparation of the monomers of this invention by reaction with the 3-alkenenitriles, include octan-1-al, o-methoxybenzaldehyde, o-chlorobenzaldehyde, m- and p-nitrobenzaldehyde, phenyl-acetaldehyde, p-tolualdehyde, and the like.

Although it is preferable to use the carboxaldehyde and the 3-alkenentrile in equal molecular amounts or to use an excess of the former, an excess of the nitrile can be used. The excess reactant functions as a solvent. In general, however, it is more economical to use an alcohol or ether as a solvent. Typical examples of such solvents are methanol, ethanol, propanol, isopropanol, butanol and dioxane. The monomers of the invention, in general, are soluble in these solvents.

The preferred condensation catalysts for the preparation of the monomeric dienes of this invention are strong bases such as sodium and potassium ethoxide, sodium tertiary-butoxide, sodium metal, potassium metal, sodamide, sodium phenyl, sodium benzyl, sodium amyl, quaternary ammonium hydroxides, for example, tetraethylammonium hydroxide and benzyl trimethylammonium hydroxide, sodium hydride and sodium triphenylmethyl. In general, poorer results are obtained by the use of sodium hydroxide and sodium acetate. Although as little as 5 mole percent of catalyst based on the moles of 3-alkenenitrile employed is effective, it is generally desirable to use an amount in the range of 10 to 40 mole percent.

The monomeric products of this invention are intermediates for the preparation of a host of useful chemicals since they contain reactive double bonds and a functional group. They can, for example, be halogenated or hydrogenated to form a series of derivatives. Some of the compounds of this invention, for example, 1-phenyl-4-methyl-2-cyano-1,3-butadiene and 1-(2-furyl)-4-methyl-2-cyano-1,3-butadiene, have pronounced pesticidal properties. They are useful for the preparation of polymeric products which are valuable for application in drying oils and resins. The polymers are also useful intermediates for polyamines and polyacids.

These new 1,4-disubstituted-2-cyano-1,3-butadienes are generically for the most part liquids which can be distilled satisfactorily under reduced pressure and thereby obtained in high purity. They are insoluble or only slightly soluble in water. On heating them with aqueous alkali, the nitrile group is readily hydrolyzed to the carboxyl group. Similarly, the nitrile group is readily converted to the carbamyl group when treated with alkaline hydrogen peroxide usually at about 40° C. Furthermore, the cyano group is easily converted to a carboalkoxy, or generically a carboxy ester group when the nitrile is heated with a strong acid in alcoholic solution, e. g., gaseous hydrogen chloride dissolved in ethanol. Thus, these new 1,4-disubstituted-2-cyano-1,3-butadienes are useful for preparing the corresponding 1,4-disubstituted-1,3-butadienes carrying in the 2-position a carboxyl group, or the alkali and alkaline earth metal salts thereof, a carboxamido group, e. g., the carbamyl group, or a carboxy ester group.

This application is a continuation-in-part of applicant's copending application Serial No. 112,181, filed August 24, 1949, now abandoned.

As many apparently widely different embodiments of this invention may be made without departing from the spirit and scope thereof, it is to be understood that this invention is not limited to the specific embodiments thereof except as defined in the appended claims.

The invention claimed is:

1. A 2-cyano-1,3-butadiene carrying on the 4-carbon a single monovalent, lower aliphatic hydrocarbon radical and on the 1-carbon a single monovalent organic radical of no more than 7 carbons.

2. A 2-cyano-1,3-butadiene carrying on the 4-carbon a single alkyl radical of no more than 4 carbons and on the 1-carbon a single monovalent organic radical of no more than 7 carbons and free of aliphatic unsaturation.

3. A 2-cyano-1,3-butadiene carrying on the 4-carbon a single alkyl radical of no more than 4 carbons and on the 1-carbon a single monovalent hydrocarbon radical of no more than 7 carbons and free of aliphatic unsaturation.

4. A polymer of the compound set forth in claim 1.

5. 1-phenyl-4-methyl-2-cyano-1,3-butadiene.

6. A polymer of 1-phenyl-4-methyl-2-cyano-1,3-butadiene.

7. 1,4-dimethyl-2-cyano-1,3-butadiene.

8. A polymer of 1,4-dimethyl-2-cyano-1,3-butadiene.

9. 1-(2-furyl)-4-methyl-2-cyano-1,3-butadiene.

10. A polymer of 1-(2-furyl)-4-methyl-2-cyano-1,3-butadiene.

11. 1-isopropyl-4-methyl-2-cyano-1,3-butadiene.

12. A polymer of 1-isopropyl-4-methyl-2-cyano-1,3-butadiene.

13. 1-(1-propenyl)-4-methyl-2-cyano-1,3-butadiene.

References Cited in the file of this patent
UNITED STATES PATENTS

| | | |
|---|---|---|
| 2,301,131 | Lichty | Nov. 3, 1942 |
| 2,328,890 | Clifford et al. | Sept. 7, 1943 |
| 2,462,407 | Langkammerer | Feb. 22, 1949 |
| 2,527,509 | Allen et al. | Oct. 31, 1950 |